US012774379B2

(12) United States Patent
Hirano et al.

(10) Patent No.: US 12,774,379 B2
(45) Date of Patent: Oct. 27, 2026

(54) POLY(VINYL ALCOHOL) RESIN COMPOSITION AND INJECTION-MOLDED OBJECT

(71) Applicant: Mitsubishi Chemical Corporation, Tokyo (JP)

(72) Inventors: Yasuhiro Hirano, Tokyo (JP); Yuya Kanamori, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 528 days.

(21) Appl. No.: 18/373,564

(22) Filed: Sep. 27, 2023

(65) Prior Publication Data

US 2024/0228744 A1 Jul. 11, 2024

Related U.S. Application Data

(63) Continuation of application No. PCT/JP2022/014978, filed on Mar. 28, 2022.

(30) Foreign Application Priority Data

Mar. 30, 2021 (JP) ................................ 2021-057801

(51) Int. Cl.

| | |
|---|---|
| ***B29C 48/40*** | (2019.01) |
| ***B29C 45/00*** | (2006.01) |
| ***C08K 3/34*** | (2006.01) |
| *B29K 29/00* | (2006.01) |

(52) U.S. Cl.

CPC .......... *C08K 3/346* (2013.01); *B29C 45/0013* (2013.01); *B29C 48/40* (2019.02); *B29C 2045/0091* (2013.01); *B29C 2945/76103* (2013.01); *B29K 2029/04* (2013.01)

(58) Field of Classification Search

CPC ...... B29K 2029/04; B29C 2945/76103; B29C 55/12; B29C 48/40; B29C 45/0013; B29C 2045/0091

See application file for complete search history.

(56) References Cited

U.S. PATENT DOCUMENTS

| | | | |
|---|---|---|---|
| 2015/0337129 | A1 | 11/2015 | Sakai et al. |
| 2020/0199343 | A1 | 6/2020 | Fukamachi |

FOREIGN PATENT DOCUMENTS

| | | | |
|---|---|---|---|
| JP | H08-151469 | A | 6/1996 |
| JP | H11-130929 | A | 5/1999 |
| JP | 2000-169649 | A | 6/2000 |
| JP | 2004-68913 | A | 3/2004 |
| JP | 2014-118541 | A | 6/2014 |
| WO | 2019/049776 | A1 | 3/2019 |

OTHER PUBLICATIONS

Ikeda et al (JP 2006002317), English translation, published on Jan. 5, 2006.*

Yamamoto (WO2017069184), English translation published on Apr. 27, 2017.*

International Search Reported dated Jun. 14, 2022, issued in PCT/JP2022/014978, with English translation thereof.

Written Opinion of the International Searching Authority dated Jun. 14, 2022, issued in PCT/JP2022/014978, with English translation thereof.

* cited by examiner

*Primary Examiner* — Gregory Listvoyb

(74) *Attorney, Agent, or Firm* — Greenblum & Bernstein, P.L.C.

(57) ABSTRACT

The present invention relates to a polyvinyl alcohol-based resin composition containing a polyvinyl alcohol-based resin (A), in which a molding shrinkage rate in at least one direction of an MD direction and a TD direction during injection molding is 0.4% or more.

5 Claims, No Drawings

POLY(VINYL ALCOHOL) RESIN COMPOSITION AND INJECTION-MOLDED OBJECT

TECHNICAL FIELD

The present invention relates to a polyvinyl alcohol-based resin composition and an injection-molded product.

BACKGROUND ART

Vinyl alcohol-based resins such as a polyvinyl alcohol-based resin (hereinafter also referred to as a PVA-based resin) are used in various molded products such as a food packaging container because of having excellent solvent resistance, gas barrier properties, strength, and transparency.

Examples of a method for molding the PVA-based resin include melt molding. Examples of the melt molding method include an injection molding method, an extrusion molding method such as a T-die method and an inflation method, a compression molding method, a blow molding method, a vacuum molding method, and press molding.

For example, Patent Literature 1 discloses a resin composition containing a PVA-based resin (A) and a multimeric aldehyde compound (B), in which a content of the multimeric aldehyde compound (B) is $0.5\times10^{-4}$ to $100\times10^{-4}$ parts by mass based on 100 parts by mass of the PVA-based resin (A). It is also disclosed that raw material pellets using such a resin composition can be melt-molded by an extrusion molding method or an injection molding method.

CITATION LIST

Patent Literature

Patent Literature 1: WO 2019/049776

SUMMARY OF INVENTION

Technical Problem

However, in injection molding for the PVA-based resin, since the PVA-based resin is hydrophilic, the PVA-based resin and a mold tend to come into close contact. Therefore, there are cases where an injection-molded product is difficult to be taken out from the mold, or a part of the injection-molded product remains in the mold, and there is a need for improved mold releasability during injection molding for the PVA-based resin.

In view of the above circumstances, an object of the present invention is to provide a PVA-based resin composition that allows an injection-molded product to be easily taken out from a mold during injection molding and that has excellent mold releasability.

Solution to Problem

In the related art, during injection molding for a resin, it has been considered that a molding shrinkage rate to the mold is preferably small. On the other hand, in the present invention, it has been found that when a molding shrinkage rate of a PVA-based resin composition in at least one direction of an MD (machine direction) direction and a TD (transverse direction) direction during injection molding is equal to or greater than a specific value, too close contact between the PVA-based resin composition and a mold can be prevented and mold releasability can be improved. Thus, the present invention has been completed.

That is, the present invention includes the following aspects.

1. A polyvinyl alcohol-based resin composition containing:
   a polyvinyl alcohol-based resin (A), in which
   a molding shrinkage rate in at least one direction of an MD direction and a TD direction during injection molding is 0.4% or more.
2. The polyvinyl alcohol-based resin composition according to the above 1, in which the molding shrinkage rate is 1.0% or less.
3. The polyvinyl alcohol-based resin composition according to the above 1 or 2, further containing:
   a molding shrinkage rate adjusting agent (B), in which
   the molding shrinkage rate adjusting agent (B) contains one or more selected from the group consisting of a resin other than a polyvinyl alcohol-based resin, an inorganic substance, an elastomer, and a hydrophobic material.
4. A pellet containing:
   the polyvinyl alcohol-based resin composition according to any one of the above 1 to 3.
5. An injection-molded product containing:
   the polyvinyl alcohol-based resin composition according to any one of the above 1 to 3.

Advantageous Effects of Invention

According to the PVA-based resin composition of the present invention, when the molding shrinkage rate is adjusted in a specific range, it is possible to provide a PVA-based resin composition that is easily taken out from a mold during injection molding and that has excellent mold releasability.

DESCRIPTION OF EMBODIMENTS

Hereinafter, a PVA-based resin composition according to the present invention will be described in detail, but these are examples of desirable embodiments, and the present invention is not limited to these contents.

A polyvinyl alcohol-based resin composition (PVA-based resin composition) according to the present embodiment is a PVA-based resin composition containing a polyvinyl alcohol-based resin (A) (PVA-based resin (A)), in which a molding shrinkage rate in at least one direction of an MD direction and a TD direction during injection molding is 0.4% or more. When the molding shrinkage rate of the PVA-based resin composition in at least one direction of the MD direction and the TD direction during injection molding is 0.4% or more, close contact between the PVA-based resin composition and a mold can be prevented, an injection-molded product is easily taken out from the mold, and mold releasability is improved. Such a molding shrinkage rate is preferably 0.45% or more, and more preferably 0.5% or more.

The above molding shrinkage rate is preferably 1.0% or less, more preferably 0.9% or less, and still more preferably 0.8% or less, from the viewpoint of not impairing a shape of the injection-molded product. That is, it is preferable that the molding shrinkage rate in at least one direction of the MD direction and the TD direction during injection molding is 0.4% or more and 1.0% or less, since the shape of the injection-molded product is not impaired and the injection-molded product is easily taken out from the mold.

In the PVA-based resin composition according to the present embodiment, it is preferable that the molding shrinkage rate in at least one direction of the MD direction and the TD direction during injection molding is within the above range, and it is more preferable that the molding shrinkage rates in both the MD direction and the TD direction during injection molding are within the above range.

That is, the molding shrinkage rate in the MD direction during injection molding is preferably 0.4% or more, more preferably 0.45% or more, and still more preferably 0.5% or more, from the viewpoint of improving the mold releasability of the injection-molded product. The molding shrinkage rate in the MD direction during injection molding is preferably 1.0% or less, more preferably 0.9% or less, and still more preferably 0.8% or less, from the viewpoint of not impairing the shape of the injection-molded product.

The molding shrinkage rate in the TD direction during injection molding is preferably 0.4% or more, more preferably 0.45% or more, and still more preferably 0.5% or more, from the viewpoint of improving the mold releasability of the injection-molded product. The molding shrinkage rate in the TD direction during injection molding is preferably 1.0% or less, more preferably 0.9% or less, and still more preferably 0.8% or less, from the viewpoint of not impairing the shape of the injection-molded product.

The molding shrinkage rates in the MD direction and the TD direction during injection molding are both preferably 0.4% or more, more preferably 0.45% or more, and still more preferably 0.5% or more, from the viewpoint of further improving the mold releasability of the injection-molded product. The molding shrinkage rates in the MD direction and the TD direction during injection molding are both preferably 1.0% or less, more preferably 0.9% or less, and still more preferably 0.8% or less, from the viewpoint of further not impairing the shape of the injection-molded product.

Note that, here, the MD direction during injection molding refers to a flow direction of a molten resin during injection molding, and the TD direction refers to a direction perpendicular to the flow direction. In addition, the molding shrinkage rates in the MD direction and the TD direction are values measured in accordance with JIS K-7152-4, and specifically, values measured by a method described in Examples. Note that, hereinafter, the expression "the molding shrinkage rate in at least one direction of the MD direction and TD direction during injection molding" may be simply referred to as a "molding shrinkage rate".

The PVA-based resin composition according to the present embodiment contains the PVA-based resin (A). The PVA-based resin composition according to the present embodiment preferably contains the PVA-based resin (A) and a molding shrinkage rate adjusting agent (B).

[PVA-based Resin (A)]

The PVA-based resin (A) used in the present embodiment is a resin mainly composed of a vinyl alcohol structural unit, which is obtained by saponifying a polyvinyl ester-based resin obtained by polymerizing a vinyl ester-based monomer. The PVA-based resin (A) has a vinyl alcohol structural unit equivalent to a degree of saponification and a vinyl ester structural unit in an unsaponified moiety.

The PVA-based resin (A) used in the present embodiment may be an unmodified PVA, or may be a copolymer-modified PVA obtained by copolymerizing a vinyl ester-based monomer and various monomers during production of a vinyl ester-based resin and saponifying the obtained copolymer, or various post-modified PVAs in which various functional groups are introduced into the unmodified PVA by post-modification. Such modification is preferably carried out within a range where water solubility of the PVA-based resin (A) is not lost. In some cases, the modified PVA may be further post-modified.

When the PVA-based resin (A) contains a copolymer-modified PVA, examples of a monomer to be used for the copolymerization with the vinyl ester-based monomer include: olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, a salt thereof, a mono- or di-alkyl ester thereof or the like; nitriles such as acrylonitrile and methacrylonitrile; amides such as acrylamide and methacrylamide; olefin sulfonic acids such as ethylene sulfonic acid, allyl sulfonic acid, and methallyl sulfonic acid, or a salt thereof; alkyl vinyl ethers; N-acrylamidomethyltrimethylammonium chloride; allyltrimethylammonium chloride; dimethyl allyl vinyl ketone; N-vinylpyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxy group-containing α-olefins such as 3-buten-1-ol, 4-penten-1-ol, and 5-hexen-1-ol, or derivatives such as an acylated product thereof. Here, (meth)allyl means allyl or methallyl, (meth)acrylate means acrylate or methacrylate, and (meth)acryl means acryl or methacryl, respectively.

Examples of such a monomer also include compounds having a diol such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

A content of these monomers is preferably within a range where the water solubility of the PVA-based resin (A) is not lost, for example, in the case of olefins such as ethylene and propylene, the content of the above monomer in the copolymer-modified PVA is preferably 5 mol % or less.

Examples of the post-modified PVA obtained by introduction of functional groups by post-modification include a resin having an acetoacetyl group introduced by a reaction with a diketene, a resin having a polyalkylene oxide group introduced by a reaction with ethylene oxide, a resin having a hydroxyalkyl group introduced by a reaction with an epoxy compound or the like, or a resin obtained by reacting an aldehyde compound having any of various functional groups with a PVA-based resin.

In the present invention, the PVA-based resin (A) is preferably a PVA-based resin for melt molding (A1) in consideration of application to various molded products.

Note that the PVA-based resin for melt molding is a PVA-based resin capable of hot melt molding and suitable for melt molding.

When a modified PVA-based resin is used as the PVA-based resin for melt molding (A1), a PVA-based resin having a structural unit having a primary hydroxy group in the side chain or an ethylene-modified PVA-based resin is preferred as the modified PVA-based resin. A PVA-based resin having a structural unit having a primary hydroxy group in the side chain is particularly preferred from the viewpoint of having excellent melt moldability. The number of the primary hydroxy group in such a structural unit is, for example, preferably 1 to 5, more preferably 1 to 2, and still more preferably 1. It is more preferable that the PVA-based resin having a structural unit having a primary hydroxy group in the side chain has a secondary hydroxy group in addition to the primary hydroxy group in the side chain.

Examples of such a PVA-based resin having a structural unit having a primary hydroxy group in the side chain include a modified PVA-based resin having a 1,2-diol structural unit in the side chain and a modified PVA-based resin having a hydroxyalkyl group structural unit in the side chain. Among these, it is particularly preferable to use a modified PVA-based resin having a 1,2-diol structural unit in the side chain, which is represented by the following general formula (1) (hereinafter, may be referred to as a "modified PVA-based resin having a side-chain 1,2-diol structural unit").

Note that moieties other than the 1,2-diol structural unit are a vinyl alcohol structural unit and a vinyl ester structural unit in an unsaponified moiety, similar to a general PVA-based resin.

[Chem. 1]

(1)

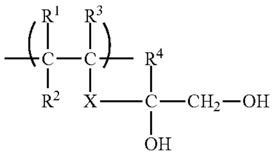

(In the above general formula (1), $R^1$ to $R^4$ each independently represent a hydrogen atom or an alkyl group having 1 to 4 carbon atoms that may have a substituent, and X represents a single bond or a bond chain.)

In the above general formula (1), $R^1$ to $R^4$ each independently represent a hydrogen atom or an alkyl group having 1 to 4 carbon atoms that may have a substituent. From the viewpoint that the end of the side chain is a primary hydroxy group, $R^1$ to $R^4$ are preferably all hydrogen atoms, but may be an alkyl group having 1 to 4 carbon atoms as long as resin properties are not remarkably impaired. The alkyl group having 1 to 4 carbon atoms is not particularly limited, and examples thereof include a methyl group, an ethyl group, an n-propyl group, an isopropyl group, an n-butyl group, an isobutyl group, and a tert-butyl group. Examples of the substituent that the alkyl group may have include a halogen group, a hydroxy group, an ester group, a carboxylic acid group, and a sulfonic acid group.

In the above general formula (1), X represents a single bond or a bond chain. X is preferably a single bond from the viewpoints of thermal stability and stability under high temperature or acidic conditions.

The bond chain is not particularly limited, and examples thereof include hydrocarbon groups such as an alkylene group, an alkenylene group, an alkynylene group, a phenylene group, and a naphthylene group. Note that these hydrocarbon groups may be substituted with halogen groups such as a fluorine atom, a chlorine atom, and a bromine atom. Examples of the bond chain further includes $—O—$, $—(CH_2O)_m—$, $—(OCH_2)_m—$, $—(CH_2O)_mCH_2—$, $—CO—$, $—COCO—$, $—CO(CH_2)_mCO—$, $—CO(C_6H_4)CO—$, $—S—$, $—CS—$, $—SO—$, $—SO_2—$, $—NR—$, $—CONR—$, $—NRCO—$, $—CSNR—$, $—NRCS—$, $—NRNR—$, $—HPO_4—$, $—Si(OR)_2—$, $—OSi(OR)_2—$, $—OSi(OR)_2O—$, $—Ti(OR)_2—$, $—OTi(OR)_2—$, $—OTi(OR)_2O—$, $—Al(OR)—$, $—OAl(OR)—$, and $—OAl(OR)O—$. Each R is independently a hydrogen atom or an optional substituent, and is preferably a hydrogen atom or an alkyl group, and particularly preferably a hydrogen atom or an alkyl group having 1 to 4 carbon atoms. In addition, m is a natural number, and is preferably 1 to 10, and particularly preferably 1 to 5.

When X is a bond chain, X is preferably an alkylene group having 6 or less carbon atoms, and particularly preferably a methylene group, or $—CH_2OCH_2—$ from the viewpoint of viscosity stability or heat resistance during the production.

A particularly preferred structure of the 1,2-diol structural unit represented by the above general formula (1) is a structure in which $R^1$ to $R^4$ are all hydrogen atoms and X is a single bond.

The degree of saponification of the PVA-based resin (A) to be used in the present embodiment is, for example, preferably 60 mol % to 100 mol %. Note that the degree of saponification here refers to a value measured in accordance with JIS K6726.

A preferred range of the degree of saponification varies depending on the modified species. For example, in the case of an unmodified PVA-based resin, the degree of saponification is, for example, preferably 60 mol % to 99.9 mol %, more preferably 65 mol % to 95 mol %, and particularly preferably 70 mol % to 90 mol %. It is preferable that such a degree of saponification is equal to or smaller than the above upper limit value since the melting point can be prevented from being too close to the decomposition temperature and the melt molding is easy. In addition, it is preferable that the degree of saponification is equal to or greater than the above lower limit value since the water solubility can be prevented from being decreased.

The degree of saponification of the modified PVA-based resin having a side-chain 1,2-diol structural unit is, for example, preferably 60 mol % to 99.9 mol %, more preferably 65 mol % to 99.8 mol %, and particularly preferably 70 mol % to 99.5 mol %. It is preferable that the degree of saponification is equal to or greater than the above lower limit value since the water solubility can be prevented from being decreased.

Further, the degree of saponification of an ethylene-modified PVA-based resin modified with a small amount of ethylene is, for example, preferably 60 mol % or more, more preferably 70 mol % to 95 mol %, and particularly preferably 71 mol % to 90 mol %. It is preferable that such a degree of saponification is equal to or smaller than the above upper limit value since the melting point can be prevented from being too close to the decomposition temperature and the melt molding is easy. In addition, it is preferable that the degree of saponification is equal to or greater than the above lower limit value since the water solubility can be prevented from being decreased.

When the PVA-based resin (A) is a modified PVA-based resin, a modification rate in such a modified PVA-based resin, that is, a content of a structural unit derived from various monomers in the copolymer, or a content of functional groups introduced by post-modification cannot be said unconditionally since the properties vary greatly depending on the type of the structural unit or the functional group, and is, for example, preferably 0.1 mol % to 20 mol %.

The modification rate when the PVA-based resin (A) is the modified PVA-based resin having a side-chain 1,2-diol structural unit is, for example, preferably 0.1 mol % to 20 mol %, more preferably 0.5 mol % to 10 mol %, and particularly preferably 1 mol % to 8 mol %. It is preferable such a modification rate is within the above range since the melt molding is easy.

Note that the content of the 1,2-diol structural unit in the PVA-based resin can be determined based on a $^1$H-NMR spectrum (solvent: DMSO-$d_6$, internal standard substance: tetramethylsilane) of a PVA-based resin having a degree of saponification of 100 mol %. Specifically, the content can be calculated based on peak areas derived from a hydroxy proton, a methine proton, and a methylene proton in the 1,2-diol structural unit, a methylene proton in the main chain, a proton of a hydroxy group linked to the main chain, and the like.

The modification rate when the PVA-based resin (A) is an ethylene-modified PVA-based resin modified with a small amount of ethylene is, for example, preferably 0.1 mol % to 15 mol %, more preferably 0.5 mol % to 10 mol %, still more preferably 1 mol % to 10 mol %, and particularly preferably 5 mol % to 9 mol %. It is preferable that such a modification rate is equal to or smaller than the above upper limit value since the water solubility can be prevented from being decreased. In addition, it is preferable such a modification rate is equal to or greater than the above lower limit value since the melt molding is easy.

A viscosity average polymerization degree of the PVA-based resin (A) to be used in the present embodiment is, for example, preferably 100 to 3,000, more preferably 150 to 2,000, still more preferably 180 to 1,000, and particularly preferably 200 to 800. It is preferable that such a viscosity average polymerization degree is equal to or smaller than the above upper limit value since a melt viscosity can be prevented from being too high during the melt molding and the melt molding is easy. Note that the viscosity average polymerization degree here refers to a value measured in accordance with JIS K6726.

The PVA-based resin (A) to be used in the present embodiment may be of one type or a mixture of two or more types. In the case of using two or more types of the PVA-based resin (A), for example, a combination of two or more unmodified PVA-based resins with different degrees of saponification, viscosity average polymerization degrees, or melting points; a combination of an unmodified PVA-based resin and a modified PVA-based resin; or a combination of two or more modified PVA-based resins with different degrees of saponification, viscosity average polymerization degrees, melting points, functional group types or modification rates is used. It is preferable that average values of the degree of saponification, the viscosity average polymerization degree, the modification rate and the like are within preferred ranges of the present embodiment.

Typically, a bonding mode of the main chain of the PVA-based resin (A) to be used in the present embodiment is mainly a 1,3-diol bond, and a content of the 1,2-diol bond is, for example, about 1.5 mol % to 1.7 mol %. The content of the 1,2-diol bond can be increased by increasing a polymerization temperature during polymerization of the vinyl ester-based monomer, and the content can be increased to 1.8 mol % or more, and more preferably 2.0 mol % to 3.5 mol %.

Examples of a method for producing the PVA-based resin (A) to be used in the present embodiment include a method of polymerizing a vinyl ester-based monomer such as vinyl acetate and performing saponification.

As the above vinyl ester-based monomer, for example, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl piperate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate can be used. From the viewpoint of price and availability, as the vinyl ester-based monomer, vinyl acetate is preferably used.

The polymerization of the vinyl ester-based monomer can be performed by any known polymerization method, for example, solution polymerization, suspension polymerization, and emulsion polymerization. Among these, it is preferable to perform the solution polymerization which can remove reaction heat efficiently under a reflux. Examples of a solvent for the solution polymerization include an alcohol, and a lower alcohol having 1 to 3 carbon atoms is preferably used.

For the saponification of the obtained polymer, a known saponification method in the related art can be adopted. That is, the saponification can be carried out using an alkali catalyst or an acid catalyst in a state where, for example, a polymer is dissolved in an alcohol or in a mixed solvent of a water and an alcohol solvent.

As the above alkali catalyst, for example, hydroxides or alcoholates of alkali metals such as potassium hydroxide, sodium hydroxide, sodium methylate, sodium ethylate, potassium methylate, and lithium methylate can be used.

Typically, the saponification is suitably carried out by a transesterification reaction using an alkali catalyst in the presence of an anhydrous alcohol solvent from the viewpoint of a reaction rate or reduction of impurities such as fatty acid salts.

A reaction temperature in the saponification reaction is preferably 20° C. to 60° C., for example. When the reaction temperature is a certain level or more, the reaction rate does not become too low, so that reaction efficiency is less likely to decrease. When the reaction temperature is a certain level or less, it is possible to prevent the reaction temperature from being equal to or higher than the boiling point of the reaction solvent, making it easy to ensure safety in production. Note that in a case of performing the saponification under a high pressure using a tower-type continuous saponification tower having high pressure resistance, the saponification can be carried out at a higher temperature, for example, 80° C. to 150° C., and a PVA-based resin having a high degree of saponification can be obtained in a short time even in the case of using a small amount of saponification catalyst.

The modified PVA-based resin having a side-chain 1,2-diol structural unit can be produced by a known production method. For example, the above modified PVA-based resin can be produced by a method described in JP2002-284818A, JP2004-285143A, or JP2006-95825A.

A content of the PVA-based resin (A) in the PVA-based resin composition is preferably 60 mass % or more, more preferably 70 mass % or more, and still more preferably 80 mass % or more. It is preferable that the content of the PVA-based resin (A) in the PVA-based resin composition is 60 mass % or more since mechanical strength is maintained. In addition, the upper limit of the content of the PVA-based resin (A) is not particularly limited as long as the molding shrinkage rate in at least one direction of the MD direction and TD direction during injection molding can be 0.4% or more.

[Molding Shrinkage Rate Adjusting Agent (B)]

The PVA-based resin composition according to the present embodiment preferably contains the molding shrinkage rate adjusting agent (B). When the PVA-based resin (A) is mixed with the molding shrinkage rate adjusting agent (B), a molding shrinkage rate of the PVA-based resin composition can be adjusted. When the PVA-based resin (A) is used alone as the PVA-based resin composition, the molding shrinkage rate tends to be relatively small. Therefore, it is preferable that a substance that can increase the molding shrinkage rate of the PVA-based resin composition compared to the case where the PVA-based resin (A) is used alone is used as the molding shrinkage rate adjusting agent (B) since it is easy to adjust the molding shrinkage rate to a desired value. Such a substance is preferably a substance having a property of assisting crystallization of the PVA-based resin (A) or expanding a shrinkage volume during the crystallization. Examples thereof include a resin other than a PVA-based resin, an inorganic substance, an elastomer, and a hydrophobic material. The molding shrinkage rate adjusting agent (B) is preferably one or more selected from the group consisting of a resin other than a PVA-based resin, an inorganic substance, an elastomer, and a hydrophobic material.

Examples of the resin other than a PVA-based resin include a chemically synthesized biodegradable resin, a microbially produced resin, and a thermoplastic elastomer. Specific examples thereof include polybutylene adipate terephthalate, polybutylene succinate, polylactic acid, polybutylene succinate adipate, polyglycolic acid, polyethylene succinate, polycaprolactone, polyethylene terephthalate succinate, polybutylene sebacate-co-terephthalate, poly(3-hydroxybutyrate-co-3-hydroxyhexanoate), polyhydroxyalkanoic acid, bacterial cellulose, poly3-hydroxybutyrate, a styrene-butadiene block copolymer, a styrene-butadiene-butylene block copolymer, a styrene-ethylene-butylene block copolymer, a styrene-isoprene block copolymer, and a styrene-isobutylene block copolymer.

From the viewpoint of not impairing biodegradability, which is a feature of the PVA-based resin (A), the resin other than a PVA-based resin is preferably a biodegradable resin such as polybutylene adipate terephthalate, polybutylene succinate, polylactic acid, polybutylene succinate adipate, polyglycolic acid, polyethylene succinate, polycaprolactone, polyethylene terephthalate succinate, polybutylene sebacate-co-terephthalate, poly(3-hydroxybutyrate-co-3-hydroxyhexanoate), polyhydroxyalkanoic acid, bacterial cellulose, and poly3-hydroxybutyrate.

In addition, the molding shrinkage rate adjusting agent (B) is more preferably one that can adjust the molding shrinkage rate of the PVA-based resin composition and also adjust hydrophilicity of the PVA-based resin composition. One of reasons why the PVA-based resin tends to come into close contact with the mold during injection molding is that the PVA-based resin has relatively high hydrophilicity. Therefore, it is preferable that the molding shrinkage rate adjusting agent (B) adjusts the molding shrinkage rate to the above value and further makes the hydrophilicity of the PVA-based resin composition relatively low since the mold releasability of the PVA-based resin composition is more easily improved. From such a viewpoint, the molding shrinkage rate adjusting agent (B) is preferably a substance having relatively low hydrophilicity or having hydrophobicity, and examples of such a resin other than a PVA-based resin include polybutylene adipate terephthalate, polybutylene succinate, polylactic acid, polycaprolactone, and a styrene-ethylene-butylene block copolymer among those mentioned above.

When the PVA-based resin composition contains the resin other than a PVA-based resin, a content of the resin other than a PVA-based resin based on a total amount of the PVA-based resin composition is not particularly limited, and may be appropriately adjusted depending on the type of the resin to obtain a desired molding shrinkage rate. For example, such a content is preferably 1 mass % or more, and more preferably 5 mass % or more from the viewpoint of improving the releasability from the mold. In addition, the content is preferably 40 mass % or less, and more preferably 30 mass % or less from the viewpoint of improving the mechanical strength.

Examples of the inorganic substance include a layered inorganic compound (a layered inorganic mineral). Specific examples thereof include talc, calcium carbonate, mica, zeolite, clay, mica, synthetic mica, bentonite, kaolinite (kaolin mineral), pyrophyllite, smectite, vermiculite, chlorite, septechlorite, serpentine, stilpnomelane, and montmorillonite. When the inorganic substance is used as the molding shrinkage rate adjusting agent (B), since the molding shrinkage rate can be adjusted even when the amount added to the PVA-based resin composition is relatively small, the biodegradability, which is a feature of the PVA-based resin (A), is not likely to be impaired.

From the viewpoint of excellent moldability, the inorganic substance is preferably talc or calcium carbonate.

When the PVA-based resin composition contains the inorganic substance, a content of the inorganic substance based on the total amount of the PVA-based resin composition is not particularly limited, and may be appropriately adjusted depending on the type of the inorganic substance to obtain a desired molding shrinkage rate. For example, such a content is preferably 100 ppm or more, and more preferably 500 ppm or more, from the viewpoint of promoting the crystallization of the PVA-based resin (A). In addition, the content is preferably 20 mass % or less, and more preferably 10 mass % or less from the viewpoint of improving the moldability. Note that ppm here refers to ppm by mass.

As the molding shrinkage rate adjusting agent (B), one type of substance may be used, or two or more types of substances may be used in combination.

[Other Components]

The PVA-based resin composition according to the present embodiment may contain other components such as a plasticizer in addition to the above components.

Examples of the plasticizer includes: compounds obtained by adding ethylene oxide to polyhydric alcohols such as aliphatic polyhydric alcohols such as ethylene glycol, hexanediol, glycerin, trimethylolpropane, and diglycerin; various alkylene oxides such as ethylene oxide, propylene oxide, and a mixed adduct of ethylene oxide and propylene oxide; sugars such as sorbitol, mannitol, pentaerythritol, xylol, arabinose, and ribulose; phenol derivatives such as bisphenol A and bisphenol S; amide compounds such as N-methylpyrrolidone; and glucosides such as α-methyl-D-glucoside.

In the case of using the PVA-based resin composition according to the present embodiment containing a plasticizer, a content of the plasticizer is preferably 0.1 to 40 parts by mass, particularly preferably 1 to 30 parts by mass, and still more preferably 2 to 20 parts by mass, based on 100 parts by mass of the PVA-based resin (A). It is preferable that the content of the plasticizer is equal to or greater than the above lower limit value since the melt moldability is easily improved, and it is preferable that the content of the plasticizer is equal to or smaller than the above upper limit value since properties of the PVA-based resin such as gas barrier properties and water solubility are not easily impaired.

Further examples of the other components include thermoplastic resins (such as a polyethylene, a polypropylene, and a polyester), fragrances, foaming agents, deodorants, bulking agents, fillers (such as inorganic fillers such as a glass bead, a glass fiber, silica, alumina, hydrotalcite, titanium oxide, zirconium oxide, boron nitride, and aluminum nitride, and organic fillers such as a melamine-formalin resin), release agents, ultraviolet absorbers, antioxidants, processing stabilizers, weathering stabilizers, fungicides, and preservatives.

These additives can be blended as appropriate.

[Method for Producing PVA-based Resin Composition]

The PVA-based resin composition according to the present embodiment can be produced, for example, by a method of appropriately mixing the respective components constituting the PVA-based resin composition. As an example of the method for producing the PVA-based resin composition according to the present embodiment, for example, the following method may be mentioned, but the production method is not limited to the following method.

A form of the PVA-based resin composition according to the present embodiment is preferably, for example, a cylindrical form (pellet form) or a powder form. Since the PVA-based resin (A) is generally obtained in a powder form, it is preferable to melt knead it together with the molding shrinkage rate adjusting agent (B) to obtain pellets made of the PVA-based resin composition according to the present embodiment in a cylindrical form, and use the pellets as raw material pellets.

Raw material pellets are generally used as raw materials for various types of melt molding. As for the shape, a diameter is, for example, preferably 0.5 mm to 4 mm, more preferably 1 mm to 3 mm, and particularly preferably 1.5 mm to 2.5 mm. A length of the raw material pellets is, for example, preferably 0.5 mm to 5 mm, more preferably 1 mm to 4 mm, and particularly preferably 1.5 mm to 3 mm.

In order to make the PVA-based resin composition according to the present embodiment into raw material pellets, it is preferable to use an extruder.

As the extruder, a single screw extruder or a twin screw extruder can be used. A twin screw extruder is preferred from the viewpoint that sufficient kneading can be obtained by appropriate shearing.

An L/D (screw length/screw diameter) of the extruder is, for example, preferably 10 to 80, more preferably 15 to 70, and particularly preferably 20 to 60. When the L/D is excessively small, kneading tends to be insufficient to make ejection unstable, and conversely, when the L/D is excessively large, the temperature of the resin composition tends to be too high due to the heat generated by excessive shearing, which tends to cause deterioration of the resin composition.

A screw rotation speed of the extruder is generally in a range of 10 rpm to 1000 rpm, preferably 30 rpm to 700 rpm, and particularly preferably 50 rpm to 500 rpm. When the rotation speed is excessively small, ejection tends to be unstable, and conversely, when the rotation speed is excessively large, the resin composition tends to deteriorate due to the heat generated by excessive shearing.

A temperature of the resin composition in the extruder cannot be generally determined and depends on the desired treatment amount, and is generally in a range of 140° C. to 280° C., preferably 150° C. to 260° C., and particularly preferably 170° C. to 240° C.

When the resin temperature is excessively high, the PVA-based resin (A) tends to be thermally deteriorated and colored, and conversely, when the resin temperature is excessively low, the viscosity of the resin tends to be high, a load tends to be applied to the extruder, or the PVA-based resin (A) tends to be not sufficiently melted.

A method for adjusting the resin temperature is not particularly limited. Generally, a method of appropriately setting the temperature of a cylinder in the extruder or a method of controlling by the rotation speed of the extruder is used.

The PVA-based resin composition according to the present embodiment is suitably used for a molded product produced by melt molding such as an injection molding method and an extrusion molding method (such as T-die extrusion, inflation extrusion, blow molding, melt spinning, and profile extrusion). The PVA-based resin composition according to the present embodiment has the molding shrinkage rate adjusted to a specific value, which allows the injection-molded product to easily taken out from the mold and has excellent mold releasability, and is thus particularly suitably used for the injection-molded product produced by an injection molding method.

[Injection-Molded Product]

That is, the present invention relates to an injection-molded product containing the PVA-based resin composition according to the present embodiment. The injection molding method is not particularly limited, and for example, raw material pellets containing the PVA-based resin composition according to the present embodiment, which are produced by the method described above, can be melted and subjected to injection molding.

Conditions in the injection molding are not particularly limited, and as an example, the following conditions are preferred.

A cylinder temperature is preferably 150° C. or higher, and more preferably 200° C. or higher from the viewpoint of melting the PVA-based resin composition. In addition, the cylinder temperature is preferably 300° C. or lower, and more preferably 250° C. or lower from the viewpoint of preventing deterioration of the resin.

Considering a crystallization temperature of the PVA-based resin (A), a mold temperature is preferably 40° C. or higher, and more preferably 60° C. or higher. In addition, the mold temperature is preferably 100° C. or lower, and more preferably 90° C. or lower from the viewpoint of further improving the mold releasability.

When the injection-molded product containing the PVA-based resin composition according to the present embodiment has a molding shrinkage rate of the PVA-based resin composition of 0.4% or more in at least one direction of the MD direction and the TD direction during injection molding, close contact between the PVA-based resin composition (injection-molded product) and the mold can be prevented, so that the injection-molded product is easily taken out from the mold, and the mold releasability is excellent.

Examples of the injection-molded product containing the PVA-based resin composition according to the present embodiment includes those having a wide variety of shapes, such as a sheet, a rod, a plate, a pipe, a disk, a ring, a bottle, a sphere, a polygon, a polyhedron, a cone, and a bicone. Specifically, such an injection-molded product is useful as various packaging materials for electronic components, foods, beverages (coffee capsules, etc.), cosmetics, pharmaceuticals, agrochemicals, and industrial chemicals, drilling materials, water-soluble cores, and the like.

EXAMPLES

Hereinafter, the present invention will be described in more detail using Examples, but the present invention is not limited to the following Examples unless it departs from the gist thereof. Note that "part" and "%" in Examples are based on mass unless otherwise specified.

(Production of PVA1)

To a reaction vessel equipped with a reflux condenser, a dropping device, and a stirrer, 20 parts (20% of a total was used for initial charge) of vinyl acetate, 32.5 parts of methanol, and 0.8 parts (20% of a total was used for initial charge) of 3,4-diacetoxy-1-butene were charged, the temperature was raised under a nitrogen stream while stirring, and after reaching a boiling point, 0.093 parts of acetyl peroxide was added to initiate polymerization.

Then, 0.4 hours after the polymerization started, 80 parts of vinyl acetate and 3.2 parts of 3,4-diacetoxy-1-butene were added dropwise at a constant rate over 11 hours. When a polymerization rate of vinyl acetate reached 91%, a predetermined amount of m-dinitrobenzene was added to end the polymerization, and subsequently, distillation was carried out while blowing in methanol vapor to remove the unreacted vinyl acetate monomer from the system to obtain a methanol solution of the copolymer.

Then, the above solution was diluted with methanol and adjusted to have a solid content concentration of 50%, and such a methanol solution was charged into a kneader. The solution temperature was maintained at 35° C., and a methanol solution of sodium hydroxide, having a sodium concentration of 2%, was added in an amount of 4.8 mmol with respect to 1 mol (total amount) of vinyl acetate structural units and 3,4-diacetoxy-1-butene structural units in the copolymer, thereby carrying out saponification. When the saponification proceeded, a saponified product precipitated and became particulate. At this time, a methanol solution of sodium hydroxide, having a sodium concentration of 2%, was further added in an amount of 7.5 mmol with respect to 1 mol (total amount) of vinyl acetate structural units and 3,4-diacetoxy-1-butene structural units, thereby carrying out saponification. After a predetermined time, acetic acid for neutralization was added in an amount corresponding to 0.8 equivalents of sodium hydroxide. The saponified product was filtered, well washed with methanol and dried in a hot air dryer to obtain a modified PVA having a side-chain 1,2-diol structural unit.

The degree of saponification of the obtained modified PVA having a side-chain 1,2-diol structural unit was analyzed by an alkali consumption required for hydrolysis of the residual vinyl acetate and 3,4-diacetoxy-1-butene structural units in the resin, and was found to be 99 mol %. In addition, the viscosity average polymerization degree was analyzed according to JIS K6726, and was found to be 530.

In addition, the content (modified amount) of the 1,2-diol structural unit represented by the above formula (1) in the modified PVA having a side-chain 1,2-diol structural unit was calculated based on an integral value measured by $^{1}$H-NMR, and was found to be 1 mol %.

Note that the conditions in $^{1}$H-NMR measurement were as follows.

Condition: 300 MHz proton NMR, $d_6$-DMSO solution, internal standard substance: tetramethylsilane, 50° C.

(Production of PVA-Based Resin Composition)

PVA-based resin compositions in Examples 1 to 6 and Comparative Example 1 were produced using PVA1 as the PVA-based resin (A).

Example 1

Talc (product number SG-95, manufactured by Nippon Talc Co., Ltd.) as the molding shrinkage rate adjusting agent (B) was added to the PVA-based resin (A) in an amount of 3,000 ppm of the total amount of the PVA-based resin composition, and the mixture was melt-kneaded using a twin screw extruder (manufactured by TECHNOVEL CORPORATION), solidified by air cooling, and then cut using a cutter using a strand cutting method to obtain a PVA-based resin composition in a pellet form.

Example 2

A PVA-based resin composition in a pellet form was obtained in the same manner as in Example 1, except that talc (product number SG-95, manufactured by Nippon Talc Co., Ltd.) as the molding shrinkage rate adjusting agent (B) was added in an amount of 3,000 ppm of the total amount of the PVA-based resin composition and polybutylene adipate terephthalate (PBAT) (ecoflex (registered trademark) manufactured by BASF) was added in an amount of 10 mass % of the total amount of the PVA-based resin composition, to the PVA-based resin (A).

Example 3

A PVA-based resin composition in a pellet form was obtained in the same manner as in Example 1, except that PBAT as the molding shrinkage rate adjusting agent (B) was added to the PVA-based resin (A) in an amount of 5 mass % of the total amount of the PVA-based resin composition.

Example 4

A PVA-based resin composition in a pellet form was obtained in the same manner as in Example 1, except that PBAT as the molding shrinkage rate adjusting agent (B) was added to the PVA-based resin (A) in an amount of 10 mass % of the total amount of the PVA-based resin composition.

Example 5

A PVA-based resin composition in a pellet form was obtained in the same manner as in Example 1, except that PBAT as the molding shrinkage rate adjusting agent (B) was added to the PVA-based resin (A) in an amount of 20 mass % of the total amount of the PVA-based resin composition.

Example 6

A PVA-based resin composition in a pellet form was obtained in the same manner as in Example 1, except that polybutylene succinate (PBS) (product name BioPBS manufactured by Mitsubishi Chemical Corporation) as the molding shrinkage rate adjusting agent (B) was added to the PVA-based resin (A) in an amount of 10 mass % of the total amount of the PVA-based resin composition.

Comparative Example 1

A PVA-based resin composition in a pellet form was obtained in the same manner as in Example 1, except that the PVA-based resin (A) was used alone.

(Injection Molding)

The PVA-based resin compositions in Examples 1 to 6 and Comparative Example 1 were subjected to injection molding under the following conditions to obtain injection-molded products (test pieces).

Injection molding machine: SE100DU-C250 type (manufactured by Sumitomo Heavy Industries, Ltd.)

Mold: ISO-D2 (type D2 mold specified in IS0294-3, manufactured by Axxicon)

Test piece size: 60 mm in length (corresponding to MD direction)×60 mm in width (corresponding to TD direction)×2 mm in thickness Cylinder temperature: nozzle/H4/H3/H2/H1/HP=230° C./230° C./220° C./220° C./210° C./200° C.

Mold temperature: 75° C.

(Measurement of Molding Shrinkage Rate)

For each injection-molded product (test piece) obtained using each PVA-based resin composition in Examples 1 to 6 and Comparative Example 1, the molding shrinkage rate was measured by the following method.

The test piece was sampled and then each shot was stored in an aluminum bag. In this state, it was maintained at 23° C. for 24 hours for adjustment (a treatment for measuring a shrinkage rate).

Regarding the adjusted test piece, dimensions in the MD direction (a flow direction of a molten resin during injection molding) and in the TD direction (direction perpendicular to the MD direction) were measured using a caliper (1/100 accuracy, manufactured by Mitutoyo Corporation).

From the measured values, the molding shrinkage rate in the MD direction and the molding shrinkage rate in the TD direction were calculated using the following equations.

Molding shrinkage rate (%) in MD direction=[(length (mm) of test piece in MD direction corresponding to mold measurement position of test piece−length (mm) of test piece in MD direction after completion of treatment for measuring shrinkage rate)/(length (mm) of test piece in MD direction corresponding to mold measurement position of test piece)]×100

Molding shrinkage rate (%) in TD direction=[(length (mm) of test piece in TD direction corresponding to mold measurement position of test piece−length (mm) of test piece in TD direction after completion of treatment for measuring shrinkage rate)/(length (mm) of test piece in TD direction corresponding to mold measurement position of test piece)]×100

For the PVA-based resin composition in each example, the molding shrinkage rate in the MD direction and the molding shrinkage rate in the TD direction of five test pieces were calculated, and the average values are shown in Table 1 as the molding shrinkage rate in the MD direction and the molding shrinkage rate in the TD direction.

(Mold Releasability Evaluation)

For each injection-molded product (test piece) obtained using each PVA-based resin composition in Examples 1 to 6 and Comparative Example 1, the mold releasability was visually evaluated according to the following criteria. Five test pieces were evaluated for each example. The evaluation results are shown in Table 1.

A (acceptable): In all of the five test pieces, no part of the test piece remained attached to the mold.

B (unacceptable): Part of the test piece remained attached to the mold in one or more of the five test pieces.

TABLE 1

| | Composition | | | Molding shrinkage rate (%) | | |
|---|---|---|---|---|---|---|
| | PVA-based resin (A) | Molding shrinkage rate adjusting agent (B) | | MD | TD | Evaluation |
| Example 1 | PVA1 | — | Talc 3,000 ppm | 0.49 | 0.53 | A |
| Example 2 | | PBAT 10 mass % | Talc 3,000 ppm | 0.54 | 0.62 | A |
| Example 3 | | PBAT 5 mass % | — | 0.46 | 0.52 | A |
| Example 4 | | PBAT 10 mass % | — | 0.52 | 0.59 | A |
| Example 5 | | PBAT 20 mass % | — | 0.57 | 0.75 | A |
| Example 6 | | PBS 10 mass % | — | 0.50 | 0.59 | A |
| Comparative Example 1 | | — | — | 0.35 | 0.39 | B |

The PVA-based resin compositions in Examples have a molding shrinkage rate of 0.4% or more in at least one direction of the MD direction and TD direction during injection molding, and thus have excellent mold releasability in injection-molded products. On the other hand, the PVA-based resin composition in Comparative Example has a molding shrinkage rate of less than 0.4% in both the MD direction and the TD direction during injection molding, and has poor mold releasability in the injection-molded product.

Although the present invention has been described in detail with reference to the specific embodiment, it will be apparent to those skilled in the art that various changes and modifications can be made without departing from the spirit and scope of the present invention. The present application is based on Japanese patent application No. 2021-057801 filed on Mar. 30, 2021, the content of which is incorporated herein as reference.

The invention claimed is:

1. A polyvinyl alcohol-based resin composition comprising:

a polyvinyl alcohol-based resin (A), wherein a molding shrinkage rate in at least one direction of an MD direction and a TD direction during injection molding is 0.4% or more, wherein a cylinder temperature during the injection molding is 150° C. or higher and 300° C. or lower, and wherein the molding shrinkage rate in the MD direction and the molding shrinkage rate in the TD direction are calculated from the following equations:

molding shrinkage rate (%) in MD direction=[(length (mm) of test piece in MD direction corresponding to mold measurement position of test piece−length (mm) of test piece in MD direction after completion of treatment for measuring shrinkage rate)/(length (mm) of test piece in MD direction corresponding to mold measurement position of test piece)]×100 molding shrinkage rate (%) in TD direction=[(length (mm) of test piece in TD direction corresponding to mold measurement position of test piece−length (mm) of test piece in TD direction after completion of treatment for measuring shrinkage rate)/(length (mm) of test piece in TD direction corresponding to mold measurement position of test piece)]×100.

2. The polyvinyl alcohol-based resin composition according to claim 1, wherein the molding shrinkage rate is 1.0% or less.

3. The polyvinyl alcohol-based resin composition according to claim 1, further comprising:

a molding shrinkage rate adjusting agent (B), wherein the molding shrinkage rate adjusting agent (B) contains one or more selected from the group consisting of a resin other than a polyvinyl alcohol-based resin, an inorganic substance, an elastomer, and a hydrophobic material.

4. A pellet comprising:

a polyvinyl alcohol-based resin composition comprising a polyvinyl alcohol-based resin (A), wherein a molding shrinkage rate in at least one direction of an MD direction and a TD direction during injection molding is 0.4% or more.

5. An injection-molded product comprising:

a polyvinyl alcohol-based resin composition comprising a polyvinyl alcohol-based resin (A), wherein a molding shrinkage rate in at least one direction of an MD direction and a TD direction during injection molding is 0.4% or more.

* * * * *